United States Patent

Telle

Patent Number: 5,539,520
Date of Patent: Jul. 23, 1996

[54] INTERFEROMETER USING FREQUENCY MODULATION OF THE CARRIER FREQUENCY

[75] Inventor: Harald Telle, Braunschweig, Germany

[73] Assignee: Dr. Johannes Heidenhain GmbH, Traunreut, Germany

[21] Appl. No.: 335,596

[22] Filed: Nov. 8, 1994

Related U.S. Application Data

[63] Continuation of Ser. No. 138,418, Oct. 18, 1993, abandoned.

[30] Foreign Application Priority Data

Oct. 19, 1992 [AT] Austria ................. 2054/92

[51] Int. Cl.⁶ ........................................ G01B 9/02
[52] U.S. Cl. ................. 356/358; 356/351; 356/349
[58] Field of Search ......................... 356/345, 351, 356/349, 357, 358

[56] References Cited

U.S. PATENT DOCUMENTS

| | | | |
|---|---|---|---|
| 4,442,455 | 4/1984 | Huignard et al. | 356/349 |
| 4,552,457 | 11/1985 | Giallorenzi et al. | 356/349 |
| 4,633,715 | 1/1987 | Monchalin | 73/657 |
| 4,647,206 | 3/1987 | Kunzmann et al. | 356/358 |
| 4,688,940 | 8/1987 | Sommargren et al. | 356/358 |
| 4,729,653 | 3/1988 | Kobayashi | 356/4.5 |
| 4,886,363 | 12/1989 | Jungquist | 356/349 |
| 4,907,886 | 3/1990 | Dandliker | 356/358 |
| 4,978,219 | 12/1990 | Bessho | 356/359 |
| 5,106,191 | 4/1992 | Ohtsuka | 356/349 |
| 5,155,550 | 10/1992 | Barger | 356/358 |
| 5,172,186 | 12/1992 | Hosoe | 356/358 |
| 5,177,566 | 1/1993 | Leuchs et al. | 356/358 |
| 5,298,970 | 3/1994 | Takamatsu et al. | 356/349 |
| 5,305,089 | 4/1994 | Hosoe | 356/358 |
| 5,333,045 | 7/1994 | Gusmeroli et al. | 356/358 |
| 5,412,474 | 5/1995 | Reasenberg et al. | 356/345 |

FOREIGN PATENT DOCUMENTS

| | | |
|---|---|---|
| 0193742 | 9/1986 | European Pat. Off. . |
| 0194941 | 9/1986 | European Pat. Off. . |
| 9010195 | 9/1990 | European Pat. Off. . |
| 0501559 | 9/1992 | European Pat. Off. . |
| 8808519 | 11/1988 | WIPO . |

*Primary Examiner*—Frank Gonzalez
*Assistant Examiner*—Robert Kim
*Attorney, Agent, or Firm*—Lorusso & Loud

[57] ABSTRACT

A modulator (2) is provided for the periodic frequency modulation of laser light. Disposed downstream of a photo detector means (13, 14) is an electronic signal processing means (15, 18, 20, 20', 21, 21', 22, 26, 27) for detecting and evaluating the amplitude modulation of electric signals caused by frequency modulation of the laser light.

20 Claims, 3 Drawing Sheets

INTERFEROMETER USING FREQUENCY MODULATION OF THE CARRIER FREQUENCY

This is a continuation of application Ser. No. 08/138,418 filed on Oct. 18, 1993 now abandoned.

The invention relates to an interferometric device for measuring the position of a reflecting object, having a laser light source, a beam divider for dividing up the laser light into a measuring beam and a reference beam, a recombination device to which the measuring beam or measuring beam portion returning from the object and the reference beam which is guided via a fixed reference path interfere with the formation of optic interference signals, a photo detector means for converting the optic interference signals into electric signals.

Interferometric devices of this kind are already known and are used to measure the position or displacement path of a reflecting object (particularly of a measuring mirror; the object can, however, also have any other reflecting surface). Up until now, homodyne interferometers have operated with one frequency or one wavelength. Depending on the position of the measuring mirror (path difference between the path covered by the measuring beam and that covered by the reference beam), constructive or destructive interference occurs at the combining device in accordance with the relative phase positions between the reference beam and the measuring beam. If the intensity of the optic interference signal is detected using a photo detection means, it is possible to also determine the position or displacement path of an object. The way of evaluating the signal is complicated because fluctuations in the intensity of the laser can falsify the measured result unless suitable precautions are taken. In addition, direct voltage signals have to be amplified with accuracy which also significantly complicates matters.

The aim of the invention is therefore to create an interferometric device of the kind mentioned in the introduction, by means of which the displacement path or position of a reflecting object can be determined easily and quickly.

According to the invention, the device is characterised by modulating means for the periodic frequency modulation of the laser light supplied to the beam divider, and an electronic signal processing means, disposed downstream of the photo detector means, for detecting and evaluating the amplitude modulation of the electric signals caused by the frequency modulation of the laser light.

The invention is based on the idea that by frequency modulation an amplitude modulation occurs in the electric signals from the photo detector means, this amplitude modulation allowing conclusions to be drawn on the position or displacement path of the object. In particular, the phase position between the measuring beam and the reference beam (which is evaluated directly by optical interference with a normal homodyne interferometer) is reflected in the phase position of amplitude modulation, wherein the phase position is measured relative to a high frequency reference signal, particularly the reference signal with which the modulation means is supplied. Whilst no detectors are provided which can follow frequencies in the optical range, there is no problem in using electronic means to process amplitude modulation which oscillates at a significantly lower modulation frequency. The modulation frequencies can, for example, be disposed in the MHz range, wherein it is favourable if a small stroke frequency modulation is performed, so that the frequency spectrum adjacent to the optic carrier frequency has only two antiphase side-bands which side-bands are disposed at a spacing above or below the modulation frequency.

With an interferometer which operates with only one carrier frequency, unlike a homodyne interferometer there is a relatively simple signal evaluation which is independent of the intensity of the laser. All that is required is for the phase of the amplitude modulation in the photo current of the photo detection means to be compared with the phase of the reference frequency (in the MHz range, for example) which drives the modulation means. As already mentioned, this phase is identical with the phase between the optic frequencies of the reference beam and of the measuring beam. Thus, the relative optic phase position between the reference beam and measuring beam can be reflected in a significantly lower frequency range (in the MHz range, for example), permitting electronic evaluation.

If a homodyne interferometer or an interferometer according to the invention operates with one single carrier frequency, the position of the object or of the measuring reflector is only known with accuracy up to the multiple of the corresponding half wavelength, since when the measuring reflector is displaced through a half wave length the same interference image or the same phase position of amplitude modulation results. Therefore, these interferometric devices are suitable less for the absolute determination of distance than for the determination of displacement paths, wherein a count simply has to be made of how often the phase position of the amplitude modulation in the photo current has changed by $2\pi$. Clearly, it is also possible to detect fractional parts of phase position changes, whereby the position of the object or displacement path can be determined with far greater accuracy than half a wavelength.

If the "accuracy" of the optic scale in units of optic wavelengths and less is not of importance, or is not the only matter of importance, but better evidence is wanted about the absolute position of the object, it is possible to operate an interferometer with two (or more) different frequencies or wavelengths, wherein all frequencies or wavelengths are guided across the reference branch and the measuring branch. Whereas an interferometer which operates with one frequency is inaccurate by Lambda/2=c/2f with respect to the position of the measuring reflector, this inaccuracy is only $\text{Lamdba}_{virtual}=2c: (f_1-f_2)$ when 2 frequencies are used, wherein c is the speed of light. This is just the oscillating wavelength (also termed the virtual wavelength) between the frequencies $f_1$ and $f_2$.

To this end, the difference of the relative phase position between the measuring- and reference beams of the one frequency $f_1$, and the relative phase position between the measuring- and reference beams of the other frequency $f_2$ have to be known. However, the problem exists that in practice it is only possible with very great difficulty to find out this difference in relative phase positions with the adjacent optic frequencies. The idea according to the invention is applied here again, wherein the optic phase position corresponding to the path difference between the reference- and measuring beam at the respective frequency is reflected on the phase position of an amplitude modulation at a significantly lower frequency which is then easy to further process electronically.

This can be done according to a preferred variant of the invention if the laser light source or a frequency displacement means disposed downstream thereof supplies laser light with at least two different optic frequencies ($f_1, f_2, \ldots$) which are frequency modulated in the modulating means each with individual modulating frequencies ($f_{MOD1}, f_{MOD2}$, ...), and that the signal processing means comprises a means for detecting the difference(s) in phase position between the components in the electric signal which are amplitude modulated with individual modulation frequencies ($f_{MOD1}$, $f_{MOD2}$, ...).

The following description is based on two different optic frequencies, but the idea of the invention can also easily be extended to three or mope optic frequencies.

By imprinting one individual frequency modulation on each of the two optic frequencies both optic frequencies are marked. The phase position of the amplitude modulation with the individual modulation frequency $f_{MOD1}$ associated with a frequency $f_1$ thus directly mirrors the relative phase position, difficult to obtain directly, between the optic reference beam and optic measuring beam at the frequency $f_2$. The phase position of the amplitude modulation of the other modulation frequency $f_{MOD2}$, with which the second frequency $f_2$ is modulated, directly mirrors the optic phase position, which is very difficult to obtain directly, between the reference beam and the measuring beam at the frequency $f_2$. If the difference between the phase positions of the two amplitude modulations is then formed, it is possible to accurately determine from it the position of the object if the position of the object is previously known to an accuracy of half an oscillating wave length. This is necessary because when the object is displaced through half an oscillating wavelength, this same phase position difference results between the two amplitude modulations. The advantage over an interferometer which operates with one frequency is that the oscillating wavelength associated with the frequency difference $f_1 - f_2$ is significantly greater than the optic wavelength associated with one of the two frequencies.

The idea according to the invention can also be used in staged operations, for example a very large oscillating wavelength can be used to give an initial rough calculation of the position of the object. A second, smaller oscillating wavelength can then further specify the position of the object because the first measurement has already given the position of the object to within an accuracy of one half of the second oscillating wavelength. Therefore, a two-stage process, or a multi-stage process, for determining the position of the object is possible.

If it assumed, for example, that the phase position difference between two respective amplitude modulations can be determined to one hundredth accuracy, if two individually frequency modulated carrier frequencies are used a dynamic range of one hundred is given. This means that, if, for example, the position of the measuring object is known to an accuracy of 10 cm, then the device according to the invention can be used to determine the exact position to an accuracy of one millimetre. By using a third individual frequency modulated carrier frequency, which, with one of the two first carrier frequencies, results in a significantly shorter oscillating wavelength or virtual wavelength, it is possible to determine the position to a further factor of 100, that is to say to an accuracy of 10 micrometers, for example. Starting from the initial 10 cm which tells you that a measuring object is disposed within it, this gives a dynamic range of 10,000.

If the idea according to the invention is applied to two or more individually frequency modulated carrier frequencies, it is not only possible to determine the position of objects in the form of optic mirrors. These so-called "non-cooperative targets" can, for example, be in the form of bodies defined by rough surfaces. No adaptation is needed to the optic scale because the large receiving apparatus can be used through which the many optic speckled patterns pass, and thus loss of phase data by break-up of intensity is practically excluded. This condition is given whenever the detector receives only one structural speckled pattern in relation to the virtual wavelength, that is to say when the optic spot diameter on the measuring object is clearly smaller than the virtual wavelength and is not tilted too greatly. That is to say, if the measuring object in relation to the virtual wavelength is a "point emitter".

A further advantage of the device according to the invention when two or more different optic carrier frequencies are used is that the difference in phase positions detected between the individual amplitude modulated components in the photo current is dependent on the movement of the measuring object on the scale of the optic wavelength, and thus on movements of the measuring object, contrary to the parallel operation of the interferometer with two wavelengths, but without modulation marking.

Further advantages and features of the invention will be explained in greater detail with the aid of the following description of the drawings.

Figure 1:
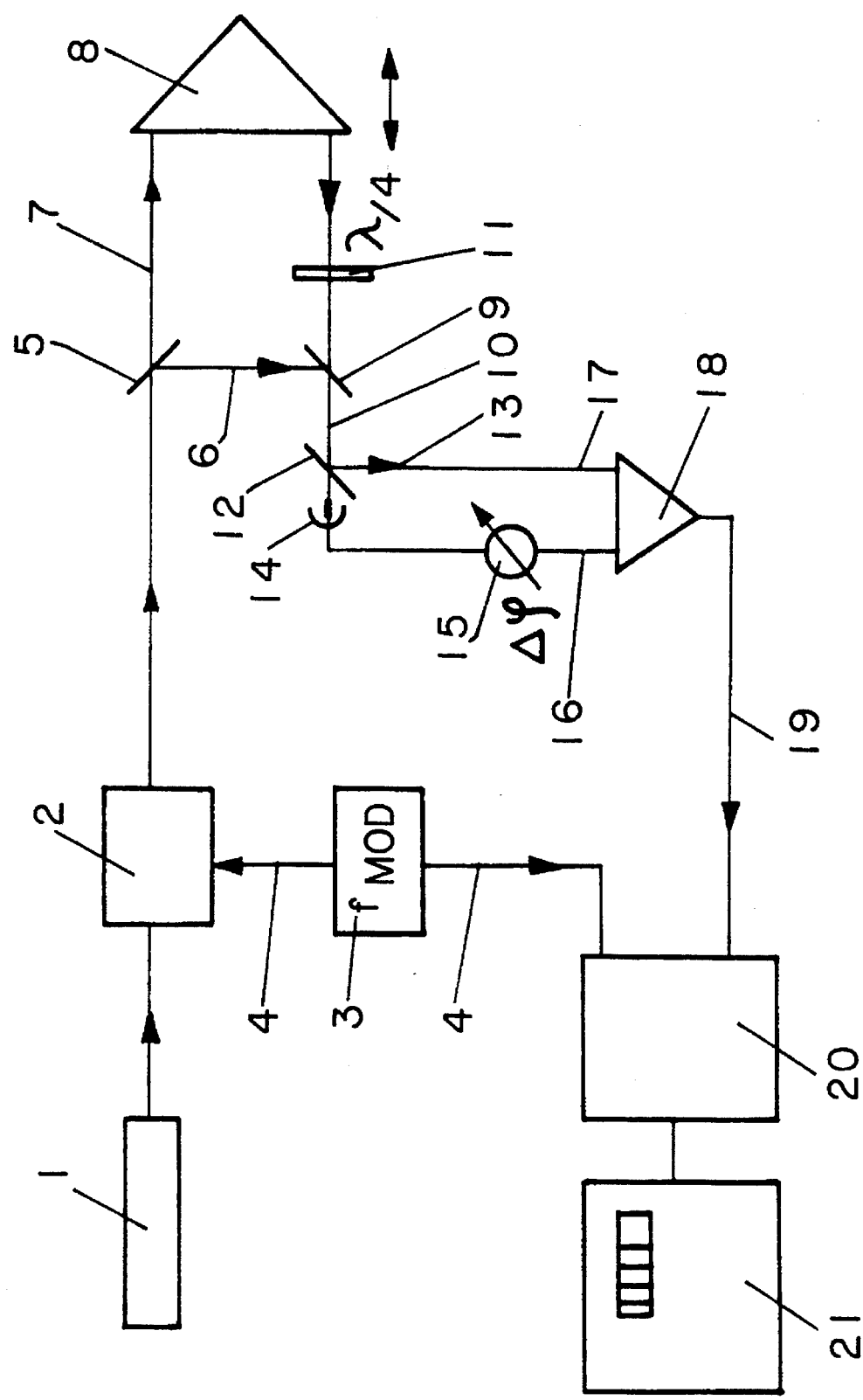
FIG. 1 shows an embodiment of the interferometric device according to the invention which is operated with one carrier frequency.

One laser light source 1 is provided with the device shown in FIG. 1. This light source can be a helium-neon laser, for example, but it can also be any other laser, in particular a semiconductor laser. With the present embodiment, the laser light source supplies linearly polarised light with one frequency. This light is frequency modulated in the modulating means 2 which is supplied with a reference frequency signal $f_{MOD}$ 4 from the reference signal oscillator 3. Electrooptic crystals are, for example, suitable for these modulating means.

In the case of a semiconductor laser, the frequency can be modulated easily by modulating the injection current. Frequency modulation therefore takes place in the laser light source itself. This also results, to a very small extent, in amplitude modulation. In case this amplitude modulation is inconvenient, it can be measured, and subtracted or divided out duping signal processing.

The small-stroke frequency modulation, in addition to the carrier frequency supplied by the laser light source, produces two adjacent antiphase side-bands at a spacing $f_{MOD}$ apart. This frequency modulated light then arrives at the beam divide 5 which divides it up into the reference beam 6 and the measuring beam 7. Whereas the reference beam 6 moves through a fixed reference path, the measuring beam 7 is guided through a movable object 8 (through a retroreflector, in the present case). The measuring beam 7, returning from the measuring path, and the reference beam 6 interfere in the recombination device 9 in the form of a beam divide, with the formation of an optic interference signal 10.

So that it is also possible to evaluate a signal when the object 8 is in positions where the path difference between the measuring beam and the interference beam is such that they interfere in destructive or constructive manner to the maximum, a Lambda quarter plate 11, a polarisation beam divide 12 and two photo detectors 13 and 14 ape provided. The optic axis of the Lambda quarter plate is at 45° to the linear polarisation direction of the laser light. This laser light can be imagined as being composed of two mutually vertical linearly polarised components, one of which is kept back in the Lambda quarter plate 11 through a quarter of a wavelength or a phase of 90°. The polarisation beam divider 12 is thus also disposed at 45° to the linear polarisation direction of the laser light. This arrangement ensures that light which can be assessed constantly arrives at one of the two intensity-measuring photo detectors 13 and 14, since they receive interference signals which have been phase displaced through exactly 90°. This artificially produced phase displacement can be compensated for again by the phase shifter 15 in the electric signal line 16 during modulation frequency. Then, the electric signals on the lines 16 and 17 are guided together and amplified in an amplification circuit 18.

Due to the frequency modulation in the modulating means 2, the signals are amplitude modulated with the modulation frequency $f_{MOD}$ on the electric lines 16 and 17 of on the outgoing circuit 19 This modulation frequency can, fop example, lie in the MHz range. The phase position of the amplitude modulation on the line 19 now accurately mirrors the relative phase between the reference beam and the measuring beam with the recombination device, wherein this phase of the amplitude modulation is measured relative to the phase of the reference frequency signal 4 which also drives the modulating means 2. The phase position comparison is carried out in the device 20 and is easily possible with electronic means due to the modulation frequency which is low in comparison with the optic frequencies. The current phase position can then be passed to an evaluation device 21 which uses it as the basis for determining the displacement path of the object or retroreflector 8. Each time that the phase position changes by $2\pi$ the retroreflector moves through half a wavelength. By counting the phase changes through $2\pi$ and by determining the fractions of the phase position change it is possible to accurately determine the position of the retroreflector 8 to fractions of half optic wavelengths.

The embodiment shown in FIG. 1 is excellent fop determining displacement paths. However, for absolute determining of distance it is necessary to accurately know the position of the measuring object, prior to measurement, to an accuracy of half an optic wavelength. Only on this basis is accurate determining of position possible. However, the absolute position of the measuring object is not known to an accuracy of one half of an optic wavelength, but the position of the object still needs to be determined. The embodiment, shown in FIG. 2, of the interferometric device according to the invention which operates with two frequencies is suitable for this. With that embodiment, the initial position of the measuring mirror 8 only has to be known to one half of the virtual wavelength which is associated with the difference in frequencies between the two frequencies $f_1$ and $f_2$. By selecting the frequencies $f_1$ and $f_2$ and thus the associated virtual wavelength (oscillating wavelength) it is possible to determine the measuring range. If, for example, the difference in frequencies between $f_1$ and $f_2$ is such that the virtual wavelength is 10 cm, then the initial position of the measuring object 8 only needs to be known to an accuracy of 5 cm, and therefore it is possible to know the position mope accurately by the factor of 100, i.e. to 0.5 mm by using the device shown in FIG. 2.

Figure 2:
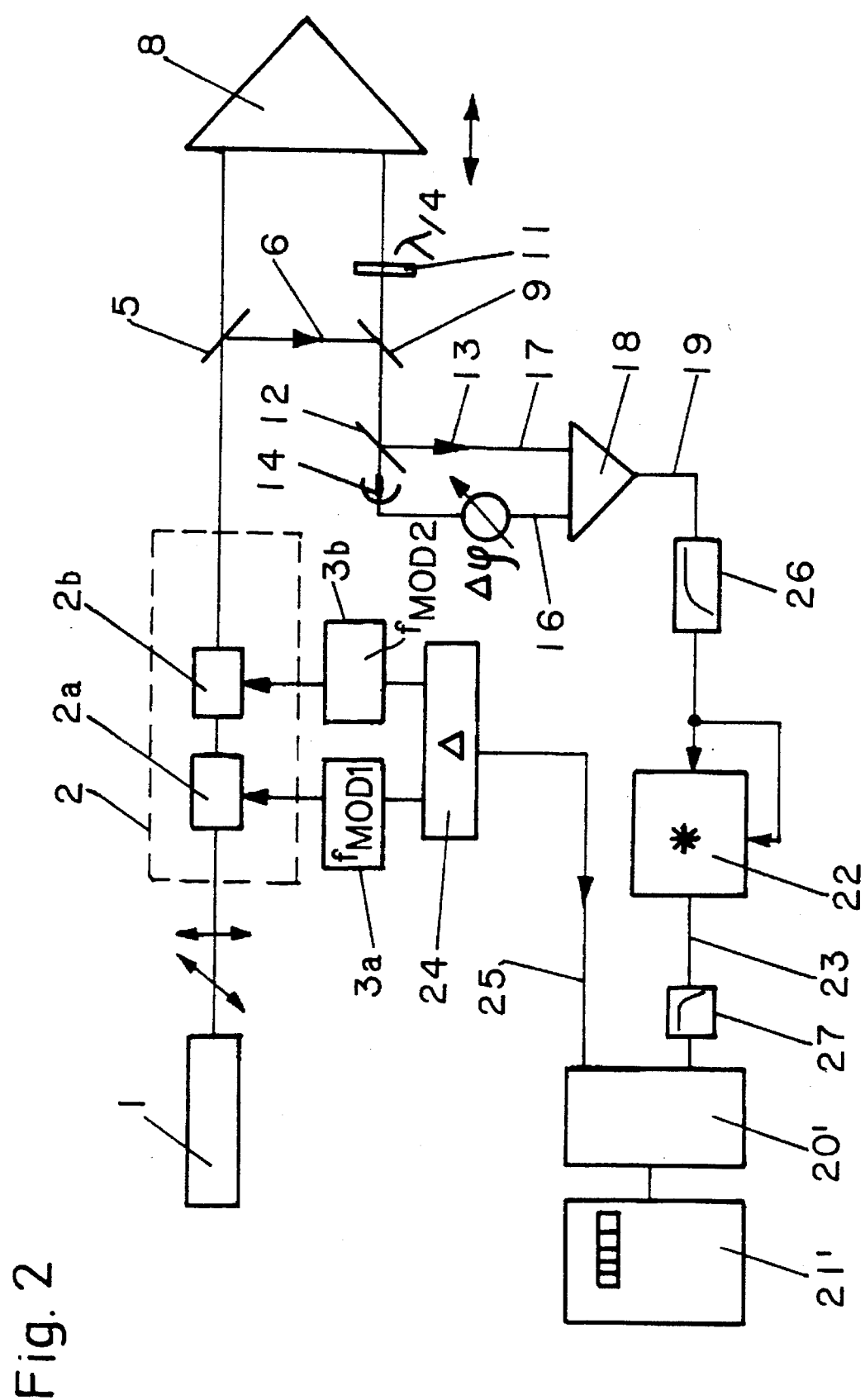
FIG. 2 shows an embodiment which is operated with two carrier frequencies.
Figure 3:
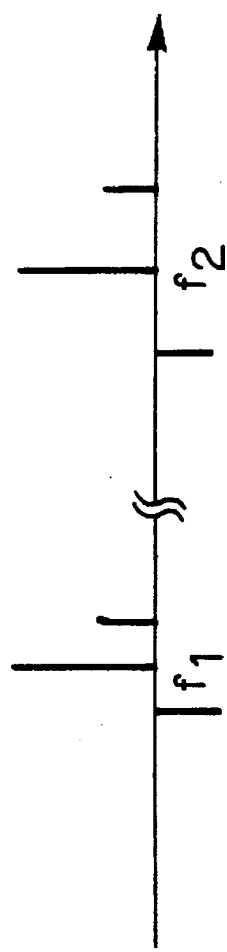
FIG. 3 shows the frequency distribution with the embodiment according to FIG. 2, in front of the beam divider.

Compared with the embodiment shown in FIG. 1, the laser light source in FIG. 2 is in the form of a helium-neon laser 1, for example, which is such that in addition to a first linearly polarised frequency $f_1$ it supplies a frequency $f_2$ which is linearly polarised perpendicular thereto. Two modulators 2a and 2b are provided in the modulating means 2, which modulators are operated at different modulation frequencies $f_{MOD1}$ and $f_{MOD2}$ from the reference frequency oscillators 3a and 3b. Therein, the modulator 2a acts on the frequency $f_1$ and the modulator 2b acts on the frequency $f_2$. The modulation frequency $f_{MOD1}$ can, for example, be 10 MHz, and the modulation frequency $f_{Mod2}$ can, for example, be 10.1 MHz. Laser light with a frequency distribution such as shown in FIG. 3 is supplied to the beam divider. Two carrier frequencies $f_1$ and $f_2$ are provided. Due to the individual frequency modulation, in addition to the carrier frequencies, side-bands occur at a spacing from each modulation frequency.

An electric signal is placed on the outgoing circuit 19, which signal has two amplitude modulated components, namely an amplitude modulation component associated with the first optical frequency $f_1$ of frequency $f_{MOD1}$ and a second amplitude modulation component associated with the second optic frequency $f_2$ and of the frequency $f_{MOD2}$.

The phase position of the amplitude modulation component with frequency $f_{MOD1}$ mirrors the relative phase position between the reference- and measuring beam and thus the path difference at frequency $f_1$. The phase position of the amplitude modulation component with the second modulation frequency $f_{MOD2}$ mirrors the relative phase position between the reference- and measuring beam and thus the path difference at the second frequency $f_2$. Therefore, the relative phase positions present at the two frequencies $f_1$ and $f_2$ are reflected between the measuring- and reference beam from the optical range to the range of substantially lower frequency, and thus other measurements are accessible.

However, with the embodiment shown in FIG. 2, the phase positions of the components amplitude modulated with the individual modulation frequencies $f_{MOD1}$ and $f_{MOD2}$ in the electric signal are not of interest per se, but instead only the phase position difference between these two amplitude modulation components is determined. This enables the position of the object or reflector 8 to be determined, wherein to clearly determine the position it is only necessary to know the position of the object previously up to one half of the virtual wavelength (oscillating wavelength between the frequencies $f_1$ and $f_2$). In order to determine the afore-mentioned phase position difference, a multiplier 22 is provided which supplies a difference frequency signal $f_{2MOD}-F_{1MOD}$ (100 kHz) to the line 23. This 100 kHz signal is compared in the phase comparison means 20' with a reference signal, also of 100 kHz, formed in the difference former 24 between the two reference signal frequencies $f_{MOD1}$ and $f_{MOD2}$.

The phase position of the measuring signal on the line 23 in relation to the reference signal on the line 25 accurately gives the phase position difference between the component modules in the electric signal amplitude modulated with the individual modulation frequencies $f_{1MOD}$ and $f_{2MOD}$. The evaluation device 21' can therefore determine and display the position of the object 8.

When the measuring object 8 moves owing to the double displacement, since frequency components can likewise occur in the kHz to MHz range, a high pass 26 is provided which blocks these lower frequencies and only allows the amplitude modulation frequencies $f_{MOD1}$ and $f_{MOD2}$ to pass through.

A low pass 27 tuned to 100 kHz keeps back higher frequencies from the phase comparison means 20'.

Figure 4:
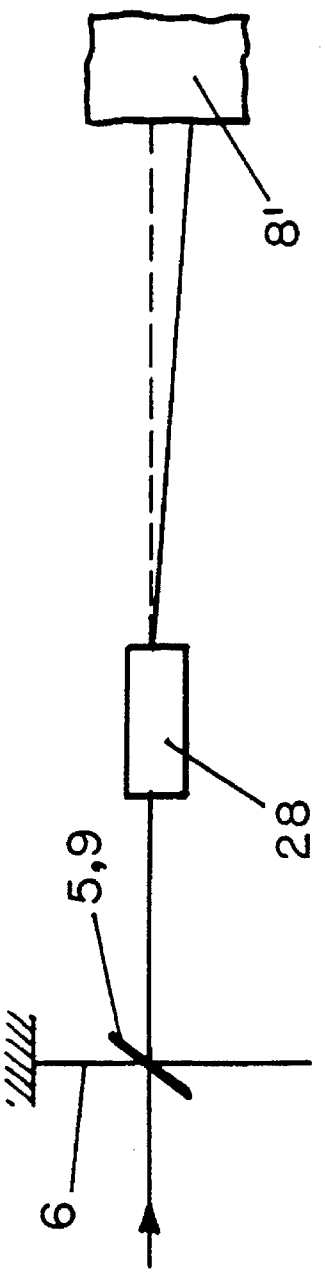
FIG. 4 shows a part of another embodiment of the interferometric device according to the invention.

As already mentioned, the invention is also particularly suitable for determining measuring objects which are not genuine optic mirrors, so-called non-cooperative-targets, such as shown in FIG. 4, for example. In that drawing, the object 8' is provided which can have a rough surface. The device according to the invention permits a position to be determined independently of the light intensity returning. The beam divider 5 and recombination device 15 are formed by the same component.

So that it is also possible to exclude reflected optic fields sent through the receiving apparatus from interfering accidentally, a deflection means can be provided which moves the measuring beam quickly over the object 8'. This deflection means 28 can be realised in many different ways, for example it can have a piezo-operated tumbling mirror. If the measuring beam is then moved quickly over the measuring object 8', for example over a circular path and in such a way that the path difference changes by less than one half the virtual wavelength, light is constantly returned by the measuring object. Admittedly, the 100 kHz-signal can occasionally be interrupted (that is to say when the optic fields sent through the receiving apparatus accidentally interfere). However, phase reversal never occurs with large amplitude. This means that further measurements can easily be made after the light has passed back in.

Deflecting the light beam can also be used to scan an object or a surface in one or two-dimensional manner without mechanically moving same, and to take a height profile.

I claim:

1. An interferometric device for measuring the position of a reflecting object, having a laser light source emitting a beam of laser light with a carrier frequency f, means for producing a modulation signal with a modulation frequency $f_{MOD}$, a modulating means which is controlled by the modulation signal and which is periodically modulating the frequency of the laser light leading to a frequency modulated light beam with said carrier frequency f, a beam divider for dividing up said frequency modulated laser light beam into a measuring beam and a reference beam, which have the same carrier frequency f, a recombination device to which the measuring beam or measuring beam portion reflected by an object which is positioned in the measuring beam and the reference beam which is guided via a fixed reference path interfere with the formation of optic interference signals, the optic interference signals having an amplitude modulation, photo detector means for converting the optic interference signals into electric signals, and reflecting the amplitude modulation of the optic interference signals, electronic signal processing means disposed downstream of the photo detector means for detecting the phrase of the amplitude of the electric signals relative to the phase of said modulation signal by comparing the phrase of the amplitude modulation with the phase of the modulation signal, electronic signal processing means disposed downstream of the photo detector means for detecting the phase of the amplitude modulation of the electric signals relative to the phase of said modulation signal by comparing the phase of the amplitude modulation with the phase of the modulation signal, the position of the object in the measuring beam being calculated from said phase of the amplitude modulation.

2. A device according to claim 1, characterised in that the laser light source supplies laser light with at least two different optic frequencies ($f_1, f_2 \ldots$) which are frequency modulated in the modulating means each with individual modulation frequencies ($f_{MOD1}, f_{MOD2} \ldots$), and that the signal processing means comprises a means for detecting the difference(s) phase position between the components in the electric signal which are amplitude modulated with individual modulation frequencies ($f_{MOD1}, f_{MOD2} \ldots$).

3. A device according to claim 2, characterised by a means for producing a difference frequency signal ($f_{MOD2} - f_{MOD1}$) between the amplitude modulated components and a means for detecting the phase position of this difference frequency signal in relation to a modulation difference frequency signal formed from the difference between the modulation signals with the individual modulation frequencies.

4. A device according to claim 3, characterised in that disposed downstream of the device for detecting the difference frequency signal is a low pass filter, the limit frequency of which is at or slightly above the difference between the modulation frequencies of frequency modulation.

5. A device according to claim 3, characterised in that the means for producing a difference frequency signal is a multiplicative mixer.

6. A device according to claim 6, characterised in that a polarisation-dependent optic phase delay means, is arranged in the reference beam or in the measuring beam.

7. A device according to claim 6, characterised in that disposed downstream of the recombination means is a polarisation-selective divider, and the individual optic signals divided up meet different photo detectors.

8. A device according to claim 6, characterised in that provided in at least one electric signalling line emanating from a photo detector is a phase displacement means, and that the signalling lines are guided together by the individual photo detectors downstream of the one or more phase displacement means.

9. A device according to claim 1, characterised in that disposed downstream of the photo detector means is a high pass filter, the limit frequency of which is at or slightly below the modulation frequency/frequencies of frequency modulation.

10. A device, according to claims 1, characterised in that a beam deflection means is provided which is capable of directing the measuring beam to various places on the object.

11. A device according to claim 10, characterised in that the beam deflection means deflects the measuring light beam constantly in accordance with a pre-determined continuous sequence of angles of deflection.

12. A device according claim 1, characterised in that the laser light source is a semiconductor laser, the emission frequency of which is frequency modulated, possibly by varying the injection current.

13. A device according to claim 1, characterised in that a frequency displacement means is disposed downstream of a single frequency laser light source and supplies laser light with at least two different optic frequencies ($f_1, f_2, \ldots$) which are frequency modulated in a modulating means each with individual modulation frequencies ($f_{MOD1}, f_{MOD2}, \ldots$), and that the signal processing means comprises a means for detecting the difference(s) in phase position between the components in the electric signal which are amplitude modulated with individual modulation frequencies ($f_{MOD1}, f_{MOD2}, \ldots$).

14. An interferometric device for measuring the position of a reflecting object, having a laser light source emitting a beam of laser light with a carrier frequency f, means for producing a modulation signal with a modulation frequency $f_{MOD}$, a modulating means which is controlled by the modulation signal and which is periodically modulating the frequency of the laser light leading to a frequency modulated light beam with said carrier frequency f, a beam divider for dividing up said frequency modulated laser light beam into a measuring beam and a reference beam, which have the same carrier frequency f, a recombination device to which the measuring beam or measuring beam portion reflected by an object which is positioned in the measuring beam and the reference beam which is guided via a fixed reference path interfere with the formation of optic interference signals, the optic interference signals having an amplitude modulation, photo detector means for converting the optic interference signals into electric signals, and reflecting the amplitude modulation of the optic interference signals, electronic signal processing means, disposed downstream of the photo detector means for detecting the phase of the amplitude modulation of the electric signals relative to the phase of said modulation signal by comparing the phase of the amplitude modulation with the phase of the modulation signal, the position of the object in the measuring beam being calculated from said phase of the amplitude modulation, wherein the laser light source supplies laser light with at least two different optic frequencies ($f_1$, $f_2$ ...) which are frequency modulated in the modulating means each with individual modulation frequencies ($f_{MOD}$, $f_{MOD2}$ ...), and that the signal processing means comprises a means for detecting the difference(s) in phase position between the components in the electric signal which are amplitude modulated with individual modulation frequencies ($f_{MOD}$, $f_{MOD2}$ ...).

15. A device according to claim 14, characterized by a means for producing a difference frequency signal ($f_{MOD2}-f_{MOD1}$) between the amplitude modulated components and a means for detecting the phase position of this difference frequency signal in relation to a modulation difference frequency signal formed from the difference between the modulation signals with the individual modulation frequencies.

16. A device according to claim 14, characterized in that disposed downstream of the device for detecting the difference frequency signal is a low pass filter, the limit frequency of which is at or slightly above the difference between the modulation frequencies of frequency modulation.

17. A device according to claim 14, characterized in that means for producing a difference frequency signal is a multiplicative mixer.

18. An interferometric device for measuring the position of a reflecting object, having a laser light source emitting a beam of laser light with a carrier frequency f, means for producing a modulation signal with a modulation frequency $f_{MOD}$, a modulating means which is controlled by the modulation signal and which is periodically modulating the frequency of the laser light leading to a frequency modulated light beam with said carrier frequency f, a beam divider for dividing up said frequency modulated laser light beam into a measuring beam and a reference beam, which have the same carrier frequency f, a recombination device to which the measuring beam or measuring beam portion reflected by an object which is positioned in the measuring beam and the reference beam which is guided via a fixed reference path interfere with the formation of optic interference signals, the optic interference signals having an amplitude modulation, photo detector means for converting the optic interference signals into electric signals, and reflecting the amplitude modulation of the optic interference signals, electronic signal processing means, disposed downstream of the photo detector means for detecting the phase of the amplitude modulation of the electrical signals relative to the phase of said modulation signal by comparing the phase of the amplitude modulation with the phase of the modulation signal, the position of the object in the measuring beam being calculated from said phase of the amplitude modulation, wherein a polarization-dependent optic phrase delay means is arranged in the reference beam or in the measuring beam and wherein provided in at least one electric signalling line emanating from a photo detector is a phase displacement means, and that the signalling lines are guided together by the individual photo detectors downstream of the one or more phase displacement means.

19. A device according to claim 18, characterized in that disposed downstream of the recombination means is a polarization-selective divider, and the individual optic signals divided up meet different photo detectors.

20. A device according to claim 18, characterized in that the laser light source is a semiconductor laser, the emission frequency of which is frequency modulated, possibly by varying the injection current.

* * * * *

UNITED STATES PATENT AND TRADEMARK OFFICE
CERTIFICATE OF CORRECTION

PATENT NO. : 5,539,520
DATED : July 23, 1996
INVENTOR(S) : Telle

It is certified that error appears in the above-indentified patent and that said Letters Patent is hereby corrected as shown below:

Column 3, Line 15: Delete "$f_2$" and insert -- $f_1.$ -- therefor;

Column 3, Line 55: "100" should not be printed in boldface;

Column 4, Line 46: Delete "duping" and insert -- during -- therefor;

Column 4, Line 51: Delete "divide" and insert -- divider -- therefor;

Column 4, Line 63: Delete "divide" and insert -- divider -- therefor;

Column 4, Line 64: Delete "ape" and insert -- are -- therefor;

Column 5, Line 17: Delete "of" and insert -- or -- therefor;

Column 5, Line 18: After "19" insert -- . --;

Column 5, Line 18: Delete "fop" and insert -- for -- therefor;

Column 5, Line 38: Delete "fop" and insert -- for -- therefor;

Column 5, Line 59: Delete "mope" and insert -- more -- therefor;

UNITED STATES PATENT AND TRADEMARK OFFICE
CERTIFICATE OF CORRECTION

PATENT NO. : 5,539,520
DATED : July 23, 1996
INVENTOR(S) : Telle

It is certified that error appears in the above-indentified patent and that said Letters Patent is hereby corrected as shown below:

Column 6, Line 41: After "$f_1$ and $f_2$)." a paragraph break should be inserted;

Column 7, Lines 51-56: Delete "electronic signal processing means disposed downstream of the photo detector means for detecting the phrase of the amplitude of the electric signals relative to the phase of said modulation signal by comparing the phrase of the amplitude modulation with the phase of the modulation signal,"; and Column 8, Line 21: Delete "6" and insert "1" therefor.

Signed and Sealed this

Eighth Day of October, 1996

Attest:

BRUCE LEHMAN

Attesting Officer

Commissioner of Patents and Trademarks